US007080522B2

(12) United States Patent  (10) Patent No.: US 7,080,522 B2
Taira  (45) Date of Patent: Jul. 25, 2006

(54) CAR AIR CONDITIONER AND CAR WITH ITS CONDITIONER

(75) Inventor: Shigeharu Taira, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 86 days.

(21) Appl. No.: 10/169,605

(22) PCT Filed: Dec. 18, 2000

(86) PCT No.: PCT/JP00/08951

§ 371 (c)(1),
(2), (4) Date: Aug. 29, 2002

(87) PCT Pub. No.: WO01/49515

PCT Pub. Date: Jul. 12, 2001

(65) Prior Publication Data

US 2003/0074905 A1  Apr. 24, 2003

(30) Foreign Application Priority Data

Jan. 4, 2000  (JP) .............................. 2000-000076

(51) Int. Cl.
*B60H 1/32* (2006.01)
(52) U.S. Cl. ..................................................... 62/244
(58) Field of Classification Search ................ 62/244, 62/114, 502; 252/67
See application file for complete search history.

(56) References Cited

U.S. PATENT DOCUMENTS

| | | | | |
|---|---|---|---|---|
| 3,881,546 A | * | 5/1975 | Otsuka et al. ................. 165/42 |
| 5,222,372 A | * | 6/1993 | DeRees et al. ............... 62/237 |
| 5,417,872 A | | 5/1995 | Fukuda et al. |
| 5,579,651 A | * | 12/1996 | Sugiyama et al. ............ 62/469 |
| 5,624,243 A | * | 4/1997 | Omodaka et al. ............ 417/366 |
| 5,647,224 A | * | 7/1997 | Kushiro et al. ............... 62/197 |
| 5,736,063 A | * | 4/1998 | Richard et al. ............... 252/67 |
| 5,829,264 A | * | 11/1998 | Ishigaki et al. ............ 62/228.3 |
| 5,927,087 A | * | 7/1999 | Ishikawa ..................... 62/174 |
| 5,984,647 A | * | 11/1999 | Miyamoto et al. ........ 417/410.1 |
| 6,042,346 A | * | 3/2000 | Doi .............................. 417/371 |
| 6,164,086 A | * | 12/2000 | Kita et al. ...................... 62/513 |
| 6,213,156 B1 | * | 4/2001 | Niki et al. .................... 138/126 |
| 6,251,300 B1 | * | 6/2001 | Takigawa et al. ............. 252/67 |

(Continued)

FOREIGN PATENT DOCUMENTS

DE  197 21 111 A  11/1997

(Continued)

OTHER PUBLICATIONS

Microfilm of specification and drawings annexed to the request of Japanese Utility Model Application No. 19396/1990 (Laid-Open No. 109911/1991), (Toshiba Corp.), Nov. 12, 1991.

*Primary Examiner*—Mohammad M. Ali
(74) *Attorney, Agent, or Firm*—Birch Stewart Kolasch & Birch LLP

(57) ABSTRACT

There is provided a car air conditioner with a high COP, low GWP and high reliability. A simple refrigerant R32 is filled in a refrigerant circuit 1 of the car air conditioner. This simple refrigerant R32 has a high COP and low GWP, but is easily polarized and produces contaminants and sludge. However, these contaminants and sludge hardly block a motor-driven expansion valve 6 or the like due to vibration and impact of a car. Therefore, this car air conditioner has high reliability. Furthermore, since the simple refrigerant R32 is a simple substance, recycling after collection is easy.

2 Claims, 6 Drawing Sheets

U.S. PATENT DOCUMENTS 6,360,551 B1 * 3/2002 Renders ................. 62/127
6,569,347 B1 * 5/2003 Nomura et al. ........... 62/114

FOREIGN PATENT DOCUMENTS

| | | |
|---|---|---|
| EP | 0 488 553 A2 | 6/1992 |
| EP | 0 693 546 A1 | 1/1996 |
| EP | 0 768 198 A2 | 4/1997 |
| EP | 0 821 046 A1 | 1/1998 |
| EP | 1 067 341 A2 | 1/2001 |
| JP | 63-3503 Y2 | 1/1988 |
| JP | 2-157573 A | 6/1990 |
| JP | 3-109911 U | 11/1991 |
| JP | 7-167057 A | 7/1995 |
| JP | 8-151587 A | 6/1996 |
| JP | 9-221693 A | 8/1997 |
| JP | 409310935 A * | 12/1997 |
| JP | 10-176689 A | 6/1998 |
| JP | 10-195426 A | 7/1998 |
| JP | 410281573 * | 10/1998 |
| JP | 02000249413 A * | 9/2000 |
| JP | 2000249413 A * | 9/2000 |
| JP | 02001183020 A * | 7/2001 |
| WO | 91/05027 A1 | 4/1991 |
| WO | WO-93/14174 A1 | 7/1993 |
| WO | 97/24415 A1 | 7/1997 |
| WO | 97/29162 A1 | 8/1997 |
| WO | WO-00/43464 A1 | 7/2000 |

* cited by examiner

CAR AIR CONDITIONER AND CAR WITH ITS CONDITIONER

This application is the national phase under 35 U.S.C. § 371 of PCT International Application No. PCT/JP00/08951 which has an International filing date of Dec. 18, 2000, which designated the United States of America.

TECHNICAL FIELD

The present invention relates to a car air conditioner and a car equipped with this car air conditioner.

BACKGROUND ART

In a conventional car air conditioner, a refrigerant circuit is filled with an incombustible refrigerant R134a in view of safety.

Meanwhile, at the Kyoto COP3 conference, manufacturers of air conditioners were strongly required to prevent discharge of refrigerants, collect refrigerants and improve a COP (coefficient of performance) in order to prevent global warming.

However, since an incombustible refrigerant R134a is used in a conventional car air conditioner, the refrigerant R134a is low ability (that is, its COP is low) and hence a compressor is large. Therefore, there is a problem that 20–30 wt % of the total fuel consumption of a car is consumed by the air conditioner, resulting in high GWP (global warming potential).

DISCLOSURE OF THE INVENTION

Accordingly, an object of the present invention is to provide a car air conditioner with a high COP and low GWP and a car using the same.

In order to achieve the above object, a first aspect of the invention provides a car air conditioner, wherein a single refrigerant R32 is filled in a refrigerant circuit.

It is noted that, in the present specification, the single refrigerant R32 refers to one substantially recognized as a single refrigerant R32 by those skilled in the art and may naturally contain a trace of a stabilizer or additive.

Since the car air conditioner of the present invention uses the single refrigerant R32, its COP is high in comparison with a conventional car air conditioner using the refrigerant R134a. Therefore, the volume of a cylinder of a compressor can be reduced, the car can be lightened, and thus improvement of the fuel consumption can be achieved.

Furthermore, since the car air conditioner of the present invention uses the single refrigerant R32 with a low GWP, global warming can be prevented.

Furthermore, since the single refrigerant R32 is slightly combustible, there are few car fire hazards.

Furthermore, since the single refrigerant R32 is a simple substance, recycling after collection is easier than the case of a mixed refrigerant. This easiness of recycling after collection provides an extremely great advantage to a car air conditioner of cars, which are scrapped in several years to over 10 years at the longest.

Since the single refrigerant R32 is an HFC refrigerant and has polarity, contaminants and sludge are easily produced and may block a capillary, motor-driven expansion valve or the like. Therefore, it was not considered to use this refrigerant for a car air conditioner of cars, which particularly require reliability. However, the inventors of the present invention found that, even when contaminants and sludge were produced from the single refrigerant R32, the contaminants and sludge did not block the capillary, motor-driven expansion valve or the like due to vibration and impact of the car. The present invention is based on this finding.

A second aspect of the invention provides a car air conditioner, wherein a mixed refrigerant containing R32 at 70 wt % or more is filled in a refrigerant circuit.

According to the car air conditioner of the present invention, since a mixed refrigerant containing R32 at 70 wt % or more is used, there is some difficulty in recycling after collection in comparison with the single refrigerant R32, but the difficulty was within tolerance. Except for this, almost the same functions and effects as those of the car air conditioner of the first aspect of the invention can be obtained.

In one embodiment, the refrigerant circuit includes a scroll compressor or rotary compressor.

According to the car air conditioner of this embodiment, a scroll compressor or rotary compressor is used for the refrigerant circuit. It was found that this scroll compressor or rotary compressor is the most suitable to a car due to its small sliding area in view of durability and light weight when the single refrigerant R32 or mixed refrigerant containing R32 at 70 wt % or more is used.

In one embodiment, the rotary compressor is a swing-type rotary compressor in which a roller revolves in a cylinder and a blade which is fixed to the roller separates a suction chamber and a compression chamber.

In the rotary compressor of the car air conditioner of this embodiment, since the blade fixed to a roller separates into the suction chamber and the compression chamber, and the blade is fixed to the roller and is not brought into line contact with the roller, this car air conditioner has high durability and can contribute to lightening of a car in relation to the single refrigerant R32 or mixed refrigerant containing R32 at 70 wt % or more.

In one embodiment, the refrigerant circuit includes a refrigerant collection port.

Since this car air conditioner of this embodiment has the refrigerant collection port, the refrigerant can be easily collected.

In one embodiment, the refrigerant circuit includes a high-pressure dome-type compressor in which a motor and a compressing part are disposed in a casing and a high-pressure refrigerant is filled at least in a space in the casing in which the motor exists.

In one embodiment, the refrigerant circuit includes a low-pressure dome-type compressor in which a motor and a compressing part are disposed in a casing and a low-pressure refrigerant is filled at least in a space in the casing in which the motor exists.

In one embodiment, the refrigerant circuit includes a fully closed compressor.

In one embodiment, the refrigerant circuit includes a semi-closed compressor.

In one embodiment, the refrigerant circuit includes an open compressor.

All the compressors of the car air conditioners of the above embodiments have favorable compatibility with the single refrigerant R32 or mixed refrigerant and can sufficiently function.

A car according to a third aspect of the invention is equipped with any one of the above car air conditioners.

Since the car of the present invention is equipped with the car air conditioner, this car not only has advantages of light weight and low fuel consumption, but also can satisfy requirements such as collection of the refrigerant and recycling.

In one embodiment, the car air conditioner is hardly ignited even if the refrigerant leaks.

The car of this embodiment has an advantage that there are few fire hazards.

In a car according to one embodiment, a partition plate is disposed between the car air conditioner and an ignition source.

Since the car of this embodiment has a partition plate between the car air conditioner and the ignition source, the leaked slightly combustible refrigerant is not ignited even if the slightly combustible refrigerant leaks from the car air conditioner. Therefore, this car is safe.

In a car according to one embodiment, a guide member for guiding a refrigerant that leaks from the car air conditioner to the outside is included.

In the car of this embodiment, since the leaked refrigerant is guided to the outside by a guide member even if the slightly combustible refrigerant leaks from the car air conditioner, the leaked refrigerant has a lower concentration and thereby is not ignited. Therefore, this car is safe.

In a car according to one embodiment, any driving motor of an electric motor, gasoline-powered engine or hybrid-type engine is included.

Since the car of this embodiment is equipped with the aforementioned car air conditioner, whether the drive motor is an electric motor, gasoline-powered engine or hybrid-type engine, this car has advantages of having light weight and low fuel consumption as well as efficiency resulting in a long travel distance per charge. In particular, when the electric motor or hybrid-type engine is used, the travel distance per charge can be extended, and the effect is extremely high.

BEST MODE FOR CARRYING OUT THE INVENTION

Hereafter, embodiments of the present invention will be described in detail with reference to the accompanying drawings.

Figure 1:
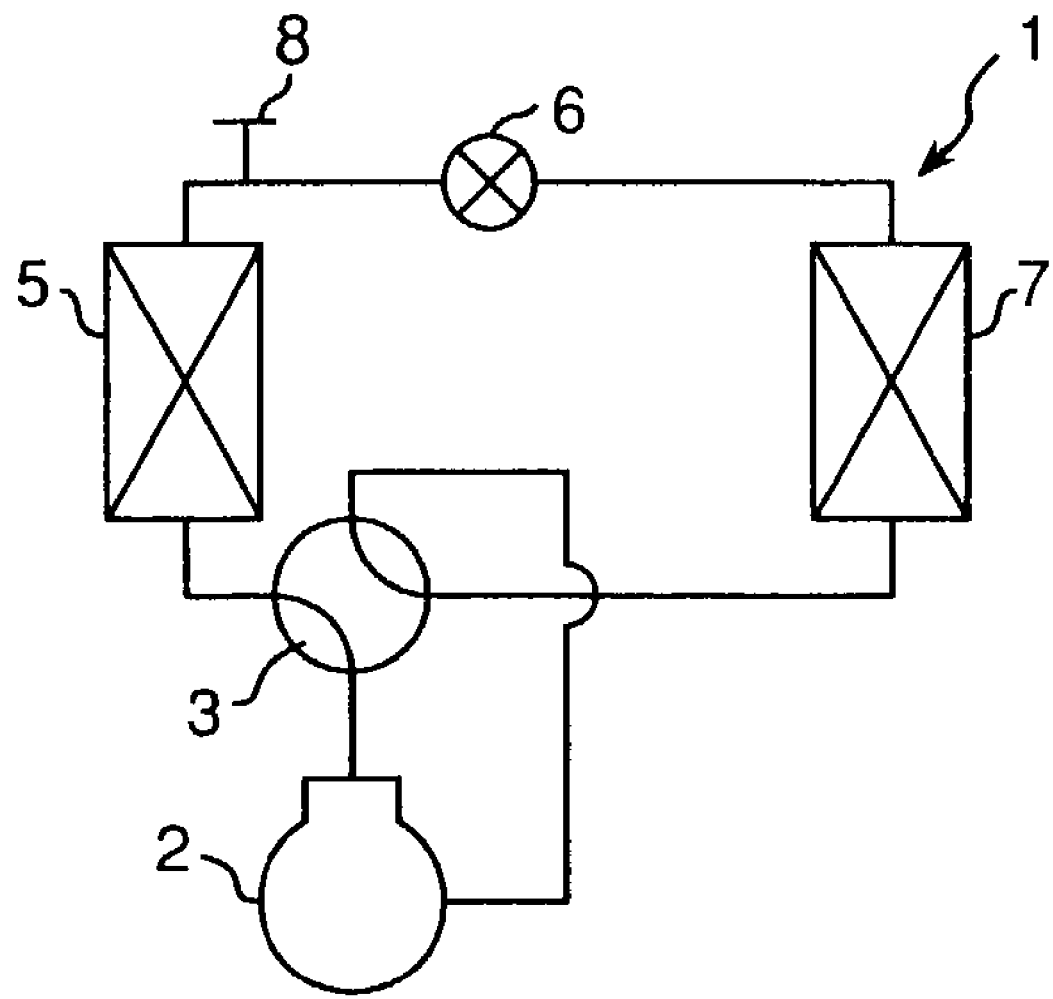
FIG. 1 is a refrigerant circuit diagram of a car air conditioner according to an embodiment of the invention.

As shown in FIG. 1, a car air conditioner of this embodiment includes a refrigerant circuit 1 constituted by a scroll compressor 2, a four-way changeover valve 3, an outdoor heat exchanger 5, a motor-driven expansion valve 6 and an indoor heat exchanger 7, which are successively connected. A refrigerant collection port 8 is disposed between the outdoor heat exchanger 5 and the motor-driven expansion valve 6 in this refrigerant circuit 1. This refrigerant circuit 1 is filled with a single refrigerant R32.

Figure 2:
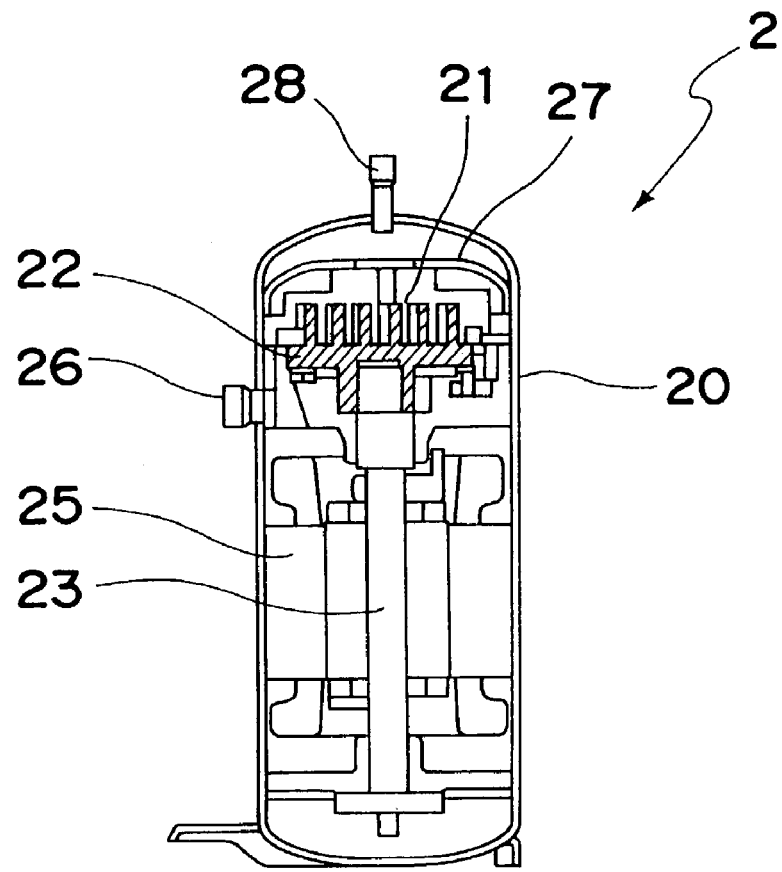
FIG. 2 is a vertical cross sectional view showing a scroll compressor used for this embodiment.
Figure 3:
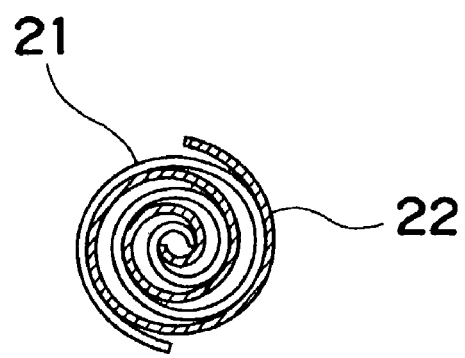
FIG. 3 is a plan view showing a fixed scroll and a movable scroll of the scroll compressor.

The scroll compressor 2 is a so-called low-pressure dome-type scroll compressor, which has a structure shown in FIGS. 2 and 3. This low-pressure dome-type scroll compressor 2 has a fixed scroll 21 and a movable scroll 22 in a dome-type casing 20 and drives the movable scroll 22 with a crank shaft 23. This crank shaft 23 is driven by a motor 25 disposed in the casing 20. The single refrigerant R32 sucked from a suction port 26 is filled in a space where the motor 25 exists, further sucked between the fixed scroll 21 and the movable scroll 22, compressed and discharged from a discharge port 28.

In the car air conditioner having the above constitution, since the single refrigerant R32 is filled in the refrigerant circuit 1, its COP is high in comparison with a conventional car air conditioner using the refrigerant R134a, and thus the volume of the compressing part (cylinder) of the compressor 2 is smaller than a conventional one. Therefore, improvement of fuel consumption of a car can be achieved since motive power required for this car air conditioner itself can be reduced and a car on which this car air conditioner is mounted can be lightened.

Furthermore, in the car air conditioner of this embodiment, since the single refrigerant R32 with a low GWP is filled in the refrigerant circuit 1, influence on global warming can be minimized even if the single refrigerant R32 leaks from the refrigerant circuit 1.

Furthermore, since the single refrigerant R32 is slightly combustible, there are few car fire hazards.

Furthermore, a car air conditioner is scrapped at the end of life of a car. Upon the scrap, the single refrigerant R32 can be readily removed from the refrigerant collection port 8 of the car air conditioner. Since this single refrigerant R32 is a simple substance, recycling after collection is easy in comparison with a mixed refrigerant. This easiness of recycling after collection provides an extremely great advantage to a car air conditioner of a car, which is scrapped in several years or over 10 years at the longest.

Furthermore, since the car air conditioner is mounted on a car, it receives vibration and impact together with the car. Therefore, it was found that, even when contaminants and sludge were produced due to the polarity of the single refrigerant R32, the vibration and impact prevented contaminants or sludge from attaching to the motor-driven expansion valve 6 or the like. Therefore, this car air conditioner has high reliability.

It is noted that the single refrigerant R32 is mixed with a refrigerating machine oil such as an alkyl benzene oil or the like.

It was found that the scroll compressor 2 had favorable lubricity and durability in relation to the single refrigerant R32.

In the above embodiment, the single refrigerant R32 is filled in the refrigerant circuit 1, but a mixed refrigerant containing R32 at 70 wt % or more may be filled instead of the single refrigerant R32. Here, in the mixed refrigerant containing R32 at at least 70 wt %, R125, R22, a carbon dioxide gas or the like is used as the remaining refrigerant.

In this case, there is some difficulty in recycling after collection in comparison with the single refrigerant R32, but the difficulty was within tolerance. Except for this, almost the same functions and effects as those of the single refrigerant R32 were obtained.

Figure 4:
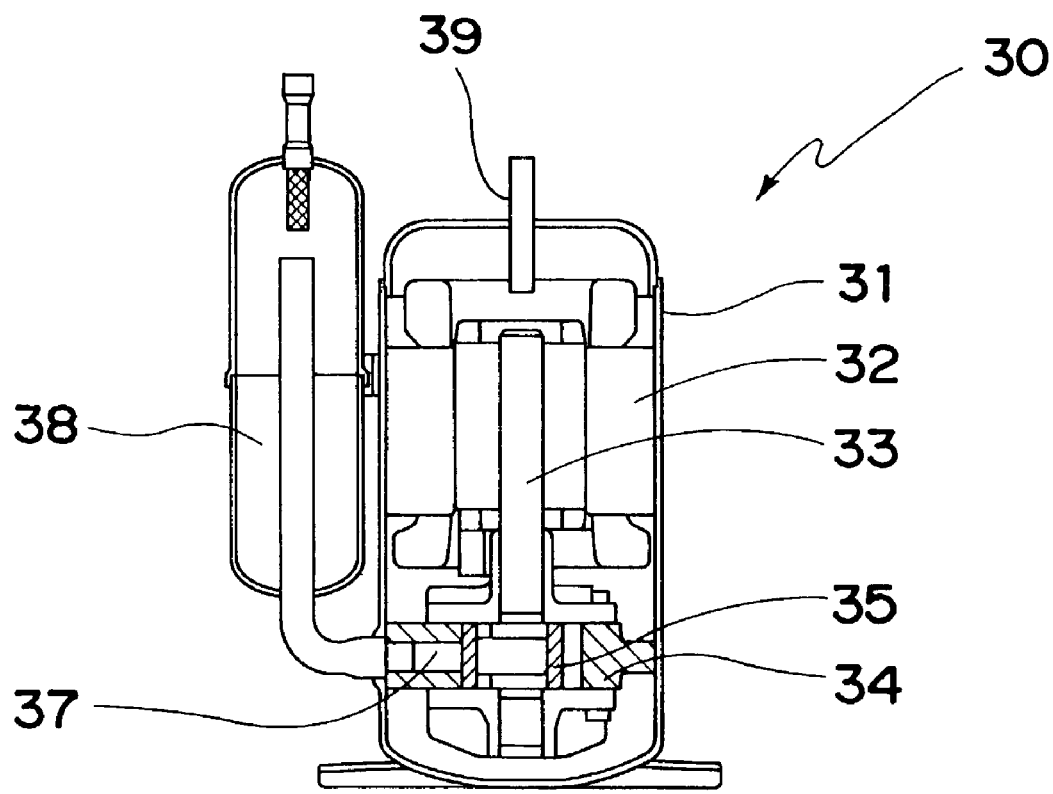
FIG. 4 is a vertical cross sectional view showing a rotary compressor.
Figure 5:
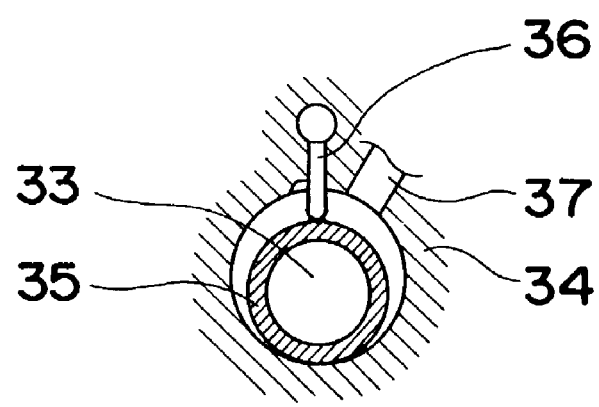
FIG. 5 is a horizontal cross sectional view showing a portion where a roller exists in the rotary compressor of FIG. 4.

It was found that, when a high-pressure dome-type rotary compressor 30 shown in FIGS. 4 and 5 was used instead of the low-pressure dome-type scroll compressor 2, lubricity and durability were also favorable in relation to the single refrigerant R32 or mixed refrigerant containing R32 at 70 wt % or more. In particular, it was found that the high-pressure dome-type rotary compressor 30 could contribute to improvement of lightening and low fuel consumption of a car along with the use of the single refrigerant R32 with a high COP or the mixed refrigerant containing R32 at 70 wt % or more.

In the high-pressure dome-type rotary compressor 30, as shown in FIGS. 4 and 5, a motor 32 is disposed in a dome, that is, a casing 31, and a crank shaft 33 is driven by this motor 32 to create a planetary motion of a roller 35 in a cylinder 34. As shown in FIG. 5, the blade 36 is pressed on a peripheral surface of the roller 35, and the cylinder 34 is partitioned into two chambers. By the planetary motion of the roller 35, a low-pressure refrigerant sucked from a suction port 37 is compressed and discharged into the casing 31. A high-pressure refrigerant is filled in the casing 31 and discharged from a discharge pipe 39 to the outside. It is noted that reference numeral 38 denotes an accumulator.

Figure 6:
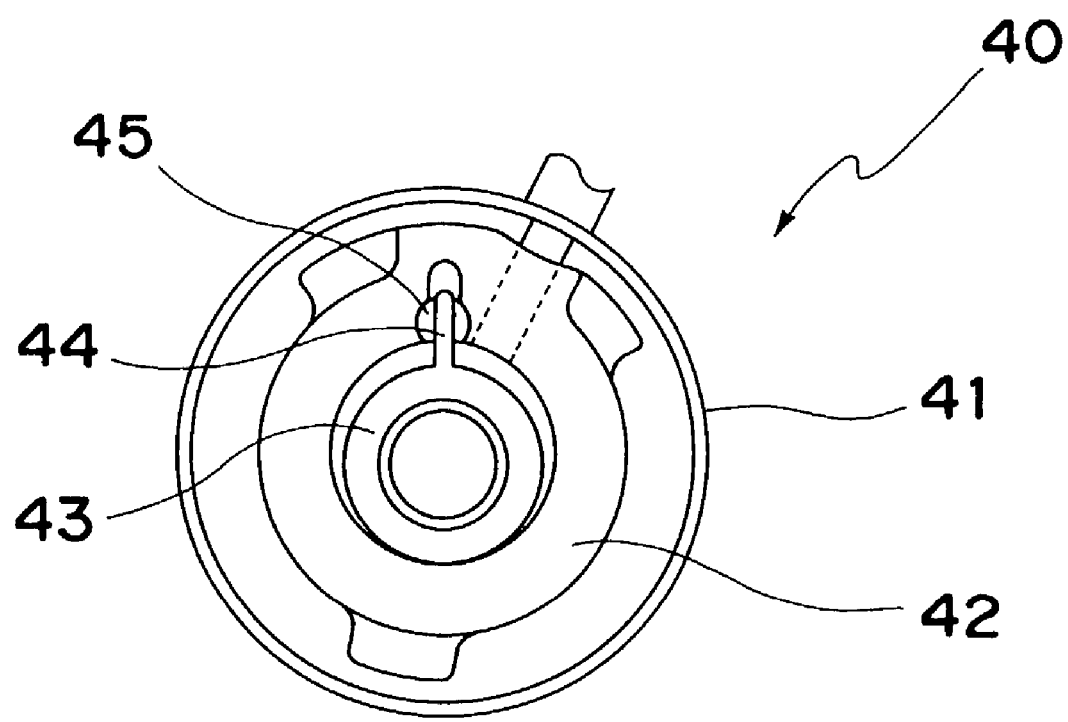
FIG. 6 is a cross sectional view showing a substantial portion of a swing-type rotary compressor.

It is more preferable to use a swing-type rotary compressor 40 shown in FIG. 6 instead of the high-pressure dome-type rotary compressor 30. In the rotary compressor 30 shown in FIGS. 4 and 5, the roller 35 and the blade 36 are separate elements, while a roller 43 and a blade 44 are integrated in the swing-type rotary compressor shown in FIG. 6. Swing bushes 45, 45 shaped in a semicircular pillar are brought into surface contact with both surfaces of this blade 44 to achieve sealing. In the cylinder 42 disposed in the casing 41, the roller 43 formed integrally with the blade 44 revolves to perform a compression action.

It was found that, since the blade 44 is fixed to the roller 43 revolving in the cylinder 42 and is brought into surface contact with the swing bushes 45, 45 shaped in a semicircular pillar, the swing-type rotary compressor 40 had the most excellent lubricity and durability in relation to the single refrigerant R32 or mixed refrigerant containing R32 at 70 wt % or more among rotary compressors.

Figure 7:
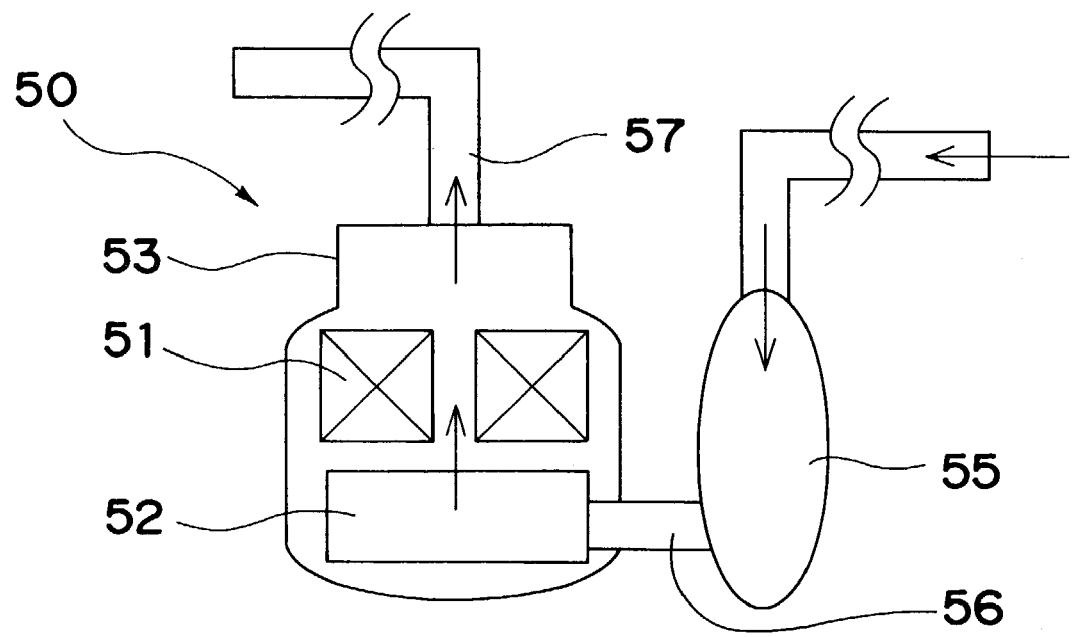
FIG. 7 is an explanatory view showing a high-pressure dome-type compressor.

It was also found that the high-pressure dome-type compressor and the low-pressure dome-type compressor had favorable compatibility with the single refrigerant R32 and the mixed refrigerant and could sufficiently function. In the high-pressure dome-type compressor, as shown in FIG. 7, a motor 51 and a compressor 52 are disposed in a casing 53, and a high-pressure refrigerant is filled at least in a space in the casing 53 where the motor 51 exists. The low-pressure refrigerant from an accumulator 55 is sucked into a compressing part 52 through a suction pipe 56, and the high-pressure refrigerant is filled in the casing 53 and discharged from a discharge pipe 57 to the outside.

Figure 8:
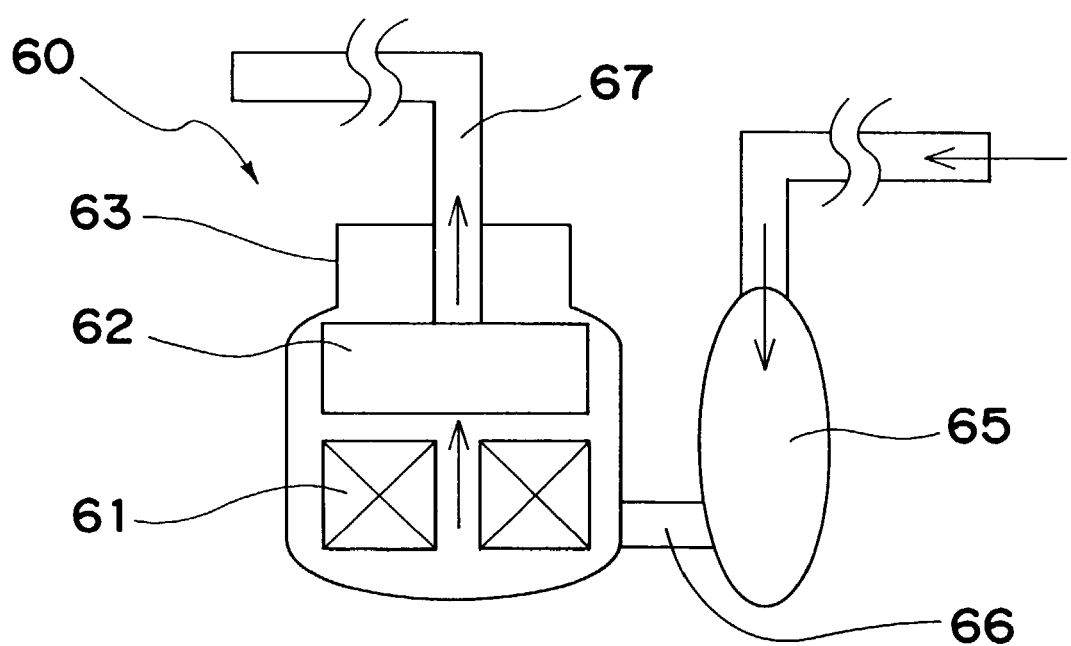
FIG. 8 is an explanatory view showing a low-pressure dome-type compressor.

Meanwhile, in the low-pressure dome-type compressor, as shown in FIG. 8, a motor 61 and a compressor 62 are disposed in a casing 63, and a low-pressure refrigerant is filled at least in a space in the casing 63 where the motor 61 exists. The low-pressure refrigerant from an accumulator 65 is sucked into the casing 63 through a suction pipe 66, and the low-pressure refrigerant in the casing 63 is sucked into a compressing part 62, compressed and discharged from a discharge pipe 67 to the outside.

Furthermore, it was found that a fully closed compressor, semi-closed compressor and open compressor also had favorable compatibility with the single refrigerant R32 and the mixed refrigerant and could sufficiently function. In the fully closed compressor, both the compressor and the motor are disposed in a sealed casing filled with a refrigerant. Furthermore, in the semi-closed compressor, a part of a compressor is disposed in a sealed casing filled with a refrigerant. Furthermore, in the open compressor, the motor and the compressor are open to the outside without using a sealed casing.

Figure 9:
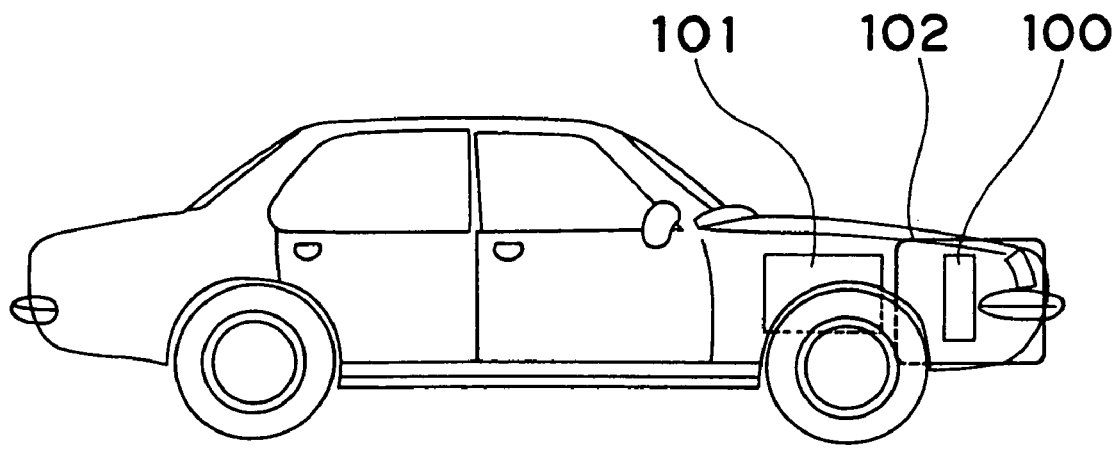
FIG. 9 is an explanatory view showing a car according to an embodiment of the invention.

In FIG. 9, the car air conditioner of the embodiment shown in FIG. 1 (designated as 100 in FIG. 9) is mounted on a chassis of a car, a partition plate 102 is disposed between an ignition source 101 such as an engine, fuel tank, electric system and so forth and the car air conditioner 100. Furthermore, there is also provided a guide member 103 for guiding a refrigerant that leaks from the car air conditioner 100 to the outside.

Even if the slightly combustible refrigerant leaks from the car air conditioner 100, the leaked refrigerant is hardly ignited since the partition plate 102 is disposed between the car air conditioner 100 and the ignition source 101. Furthermore, even if the slightly combustible refrigerant leaks from the car air conditioner 100, this leaked refrigerant is guided to the outside by the guide member. Therefore, the leaked refrigerant has a lower concentration and is not ignited. Thus, this car is safe.

Figure 10:
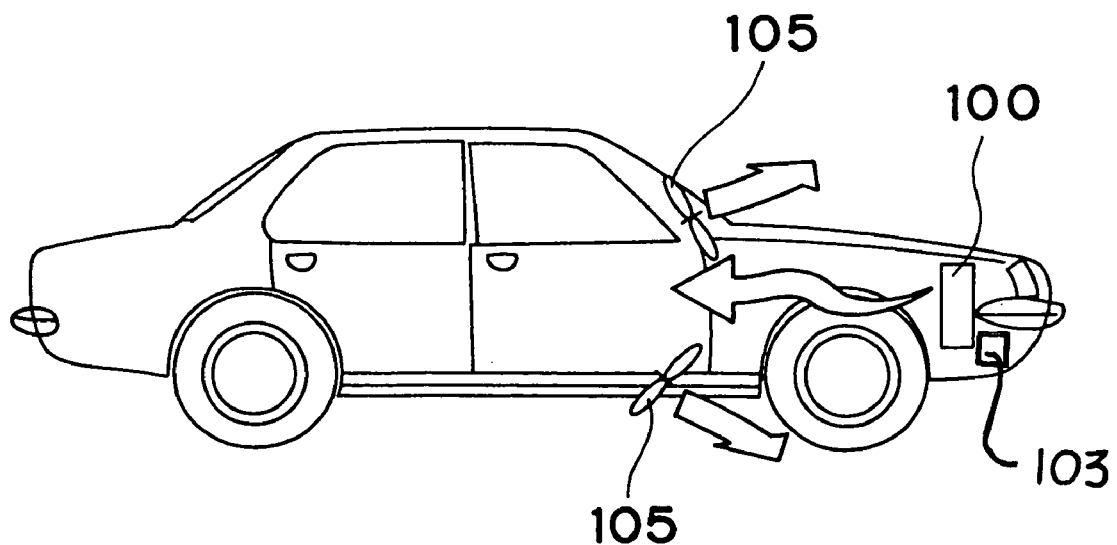
FIG. 10 is an explanatory view showing a car according to another embodiment of the invention.

FIG. 10 shows a car of another embodiment. In this car, when a slightly combustible refrigerant leaks from the car air conditioner 100, the leakage of the slightly combustible refrigerant is detected by a sensor, and fans 105, 105 are driven to forcibly discharge air from the inside of the car. Thus, safety is ensured.

The driving motor of the car may be any of an electric motor, gasoline-powered engine or hybrid-type engine. Since the car air conditioners of the above embodiments have a high COP, a travel distance per charge can be extended, and their effect is extremely high particularly in the case of the electric motor or hybrid-type engine.

In the above embodiments, the car air conditioner includes a four-way changeover valve 3 and is used for both cooling and heating, but may be used exclusively for cooling without including a four-way changeover valve. Furthermore, a capillary may be used instead of a motor-driven expansion valve.

As evident from the above, since the single refrigerant R32 is filled in the refrigerant circuit in the car air conditioner of the first aspect of the invention, its COP is high in comparison with a conventional car air conditioner using the refrigerant R134a. Therefore, the volume of the cylinder of the compressor can be reduced, the car can be lightened, and thus improvement of fuel consumption can be achieved. Furthermore, this car air conditioner can contribute to prevention of global warming since the single refrigerant R32 has a low GWP.

Furthermore, according to the car air conditioner of the present invention, since the single refrigerant R32 is slightly combustible, there are few car fire hazards.

Furthermore, according to the car air conditioner of the present invention, since the single refrigerant R32 is used, recycling of the refrigerant after collection is easy in comparison with a mixed refrigerant.

Furthermore, according to the car air conditioner of the present invention, since the single refrigerant R32 has polarity, contaminants and sludge are easily produced, but these contaminants, sludge and the like are not attached to a capillary or a motor-driven expansion valve due to vibration and impact of the car, and thus high reliability can be obtained.

In the car air conditioner of the second aspect of the invention, a mixed refrigerant containing R 32 at 70 wt % or more is filled in the refrigerant circuit, there is some difficulty in recycling after collection in comparison with the single refrigerant R32, but this difficulty is within tolerance. Except for this, almost the same functions and effects as those of the car air conditioner of the first aspect can be obtained.

Since the car air conditioner of an embodiment includes a scroll compressor or rotary compressor, compatibility with the single refrigerant R32 or mixed refrigerant containing R32 at 70 wt % or more is favorable, and improvement of durability and light weight can be achieved.

In the car air conditioner of an embodiment, since a swing-type rotary compressor is used wherein a roller revolves in a casing, a blade fixed to the roller separates a suction chamber and a compression chamber, the blade is not brought into line contact with the roller and is brought into surface contact with swing bushes, durability is high in relation to the single refrigerant R32 or mixed refrigerant containing R32 at 70 wt % or more, and the car air conditioner can contribute to lightening of a car.

Since the car air conditioner of an embodiment has a refrigerant collection port, a refrigerant can be readily collected.

Since the car air conditioner of an embodiment is equipped with any of a high-pressure dome-type compressor, low-pressure dome-type compressor, fully closed compressor, semi-closed compressor or open compressor, the car air conditioner has favorable compatibility with the refrigerant and can sufficiently function.

Since the car of the third aspect of the invention is equipped with the above car air conditioner, this car not only has advantages of light weight and lower fuel consumption, but also can satisfy requirements of collection and recycling of the refrigerant.

The car of an embodiment has an advantage of few fire hazards since the car air conditioner is hardly ignited even when a refrigerant leaks.

Since the car of an embodiment has a partition plate between a car air conditioner and an ignition source, a leaked refrigerant is not ignited. Thus, this car is safe.

Since the car of an embodiment has a guide member for guiding a leaked refrigerant from the car air conditioner to the outside, the leaked refrigerant has a lower concentration and thereby is not ignited. Thus, this car is safe.

Since the car of an embodiment is equipped with the car air conditioner and any driving motor of an electric motor, gasoline-powered engine or hybrid-type engine, the car has advantages of light weight, lower fuel consumption and favorable efficiency resulting in a long travel distance per charge particularly when a driving motor is composed of an electric motor or a hybrid-type engine.

What is claimed is:

1. A car equipped with a car air conditioner, comprising:
a car refrigerant circuit, wherein a single refrigerant R32 is filled in said car refrigerant circuit, the car air conditioner is not ignited even if the refrigerant leaks;
a partition plate, said partition plate preventing refrigerant from leaking into an engine compartment including an ignition source; and
a guide member, said guide member guiding a refrigerant that leaks from the car air conditioner to the outside of the vehicle.

2. A car equipped with a car air conditioner, comprising:
a car refrigerant circuit, wherein a mixed refrigerant containing R32 at 70 wt % or more is filled in said car refrigerant circuit, the car air conditioner is hardly ignited even if the refrigerant leaks;
a partition plate, said partition plate preventing refrigerant from leaking into an engine compartment including an ignition source; and
a guide member, said guide member guiding a refrigerant that leaks from the car air conditioner to the outside of the vehicle.

* * * * *